US007167640B2

(12) United States Patent
Gadre et al.

(10) Patent No.: US 7,167,640 B2
(45) Date of Patent: Jan. 23, 2007

(54) METHOD AND APPARATUS FOR EFFICIENTLY ALLOCATING MEMORY IN AUDIO STILL VIDEO (ASV) APPLICATIONS

(75) Inventors: Shirish Gadre, San Jose, CA (US); Fang-Chuan Wu, Fremont, CA (US); Elif Albuz, Sunnyvale, CA (US); Raman Subramanian, Santa Clara, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 1185 days.

(21) Appl. No.: 10/074,390

(22) Filed: Feb. 11, 2002

(65) Prior Publication Data

US 2003/0154333 A1 Aug. 14, 2003

(51) Int. Cl.
*H04N 5/00* (2006.01)
*H04N 5/91* (2006.01)

(52) U.S. Cl. ................. 386/125; 386/66; 386/98

(58) Field of Classification Search ............ 345/560, 345/589, 629–634, 638, 660, 667, 682, 718; 386/125–126; 725/140, 141; 348/7–9, 12–13, 348/423, 552
See application file for complete search history.

(56) References Cited

U.S. PATENT DOCUMENTS

| 5,621,772 A * | 4/1997 | Maturi et al. ............... 375/366 |
| 6,233,393 B1 * | 5/2001 | Yanagihara et al. ........ 386/125 |
| 6,567,371 B1 * | 5/2003 | Otomo et al. ............ 369/275.3 |
| 6,573,946 B1 * | 6/2003 | Gryskiewicz ............... 348/600 |
| 2003/0098869 A1 * | 5/2003 | Arnold et al. .............. 345/589 |

* cited by examiner

*Primary Examiner*—Thai Q. Tran
*Assistant Examiner*—Mishawn Dunn
(74) *Attorney, Agent, or Firm*—Haverstock & Owens LLP

(57) ABSTRACT

A dynamic allocation of available ASV buffer memory space is performed on each pack in a DVD-A bitstream one pack at a time. Concurrently, an ASV buffer table is updated for each type of data pack currently being processed. The ASV buffer table includes pointers corresponding to the various fields that form a particular ASV frame. In this way, only that memory that is required to store a particular ASV frame is used thereby allowing the ASV buffer memory to be configured on the fly in such a manner as to efficiently store the required ASV frame data. When a particular ASV frame is to be displayed, or otherwise processed, the ASV buffer table is accessed, and the particular pointers for a specific ASV frame are looked up and used to access the desired ASV frame.

34 Claims, 12 Drawing Sheets

Fig. 6

| HLI 502 | SP 504 | VID1 506-1 | VID2 506-2 | PG_END 508 | HLI 510 | SP1 512-1 | SP2 512-2 | VID1 514 | PG_END 516 |

$add_0$, $add_1$, $add_2$, $add_3$, $add_4$, $add_5$, $add_6$, $add_7$ $ASV_1$, $ASV_2$

622

| | HLI | SP | VIDEO | RESERVED |
|---|---|---|---|---|
| $ASV_0$ | start add$_1$ | start add$_2$ | start add$_3$ | |
| ASV1 | start add$_4$ | start add$_5$ | start add$_6$ | |
| $ASV_2$ | start add$_7$ | start add$_8$ | start add$_9$ | |
| | | | | |
| | | | | |
| | | | | |
| | | | | |
| | | | | |
| | | | | |
| | | | | |
| $ASV_n$ | start add$_{n-2}$ | start add$_{n-1}$ | start add$_n$ | |

800

900

| | HLI | SP | VIDEO | |
|---|---|---|---|---|
| $ASV_1$ | $add_0^{[1,1]}$ | $add_1^{[1,2]}$ | $add_2$ | |
| $ASV_2$ | $add_4$ | $add_5$ | $add_6$ | |

METHOD AND APPARATUS FOR EFFICIENTLY ALLOCATING MEMORY IN AUDIO STILL VIDEO (ASV) APPLICATIONS

CROSS REFERENCE TO RELATED APPLICATION

This application is related to U.S. patent application Ser. No.: 10/074,773 entitled, "METHOD AND APPARATUS FOR EFFICIENTLY ALLOCATING MEMORY WHEN SWITCHING BETWEEN DVD AUDIO AND DVD VIDEO" by Gadre et. al. filed concurrently herewith

BACKGROUND OF THE INVENTION

1. Field of the Invention

This invention relates generally to consumer electronics. More particularly, the invention relates to efficiently storing audio and video data in a memory device.

2. Description of the Related Art

DVD-Audio (DVD-A) is a Digital Versatile Disk (DVD) format that is specifically designed to hold audio data, and particularly, high-quality music. The DVD Forum, consisting of 230 leading companies worldwide, released the final DVD-A specification in March of 1999. The new DVD format is said to provide at least twice the sound quality of audio CD on disks that can contain up to seven times as much information. Various types of DVD-A-compatible DVD players are being manufactured, in addition to the DVD-A players specifically developed for the format.

Almost all of the space on a DVD video disk is devoted to containing video data. As a consequence, the space allotted to audio data, such as a Dolby Digital 5.1 soundtrack, is severely limited. A lossy compression technique—so-called because some of the data is lost—is used to enable audio information to be stored in the available space, both on standard CDs and DVD-Video disks. In addition to using lossless compression methods, DVD-A also provides more complexity of sound by increasing the sampling rate and the frequency range beyond what is possible for the space limitations of CDs and DVD-Video. DVD-Audio is 24-bit, with a sampling rate of 96 kHz; in comparison, DVD-Video soundtrack is 16-bit, with a sampling rate of 48 kHz, and standard audio CD is 16-bit, with a sampling rate of 44.1 kHz.

DVD-Audio allows for a wide variety of audio formats at varying levels of specification. DVD-Audio supports the same multi-channel audio formats used with DVD-Video. Therefore both DVD-Video and DVD-Audio can provide high definition multi-channel audio recorded in the Dolby Digital and DTS audio formats. However, real advantage of the DVD-Audio specification over DVD-Video and CD is in the significantly increased quality of the PCM audio format. PCM or "Pulse-Coded-Modulation" is the audio format standard for CD's and available on many DVD-Video's. DVD-Audio supports a significantly higher quality of PCM audio than is possible on CD or DVD-Video. DVD-Audio PCM can be recorded with a range of frequencies that are more than four times that of a CD while DVD-Audio PCM has a much greater dynamic range that possible on a CD. The greater storage capacity of DVD's allows for much more music to be recorded than possible on CD's.

The following table outlines the technical specifications for PCM on DVD-Audio and standard CD's.

TABLE I

| Specification | DVD-Audio | CD |
| --- | --- | --- |
| Audio Format | PCM | PCM |
| Disk Capacity | 4.7 Gb - Single layer<br>8.5 Gb - Dual Layer<br>17 Gb - Double Sided Dual Layer | 650 MB |
| Channels | Up to 6 | 2 (stereo) |
| Frequency Response | 0–96 kHz (max) | 5–20 kHz |
| Dynamic Range | 144 db | 96 db |
| Sampling Rate - 2 channel | 44.1, 88.2, 176.4 KHz or 48, 96, 192 KHz | 44.1 kHz |
| Sampling Rate - multichannel | 44.1, 88.2, 176.4 KHz or 48, 96 KHz | n/a |
| Sample Size (Quantization) | 12, 16, 20, or 24 bits | 16 bits |
| Maximum Data Rate | 9.6 MBps. | 1.4 MBps |

In addition to audio, a DVD-Audio disk can contain a limited amount of video, which can be used to display text, such as lyrics or notes; or stills such as a photo album. Such still images, described as Audio Still Video (ASV), are recorded on disc in a separate file. Each still is an MPEG-2 intra-frame and can, optionally, be accompanied by a sub-picture for a menu. Still images are pre-loaded into the player's memory before the audio is played or between audio tracks where a mute is acceptable. This allows the images to be presented either as a slide show or browsable by the user. Transitions for still images include cut, fade, dissolve and wipe. Subpictures allow still images to be used as menus or for the display of lyrics etc.

In view of the foregoing, it would advantageous and therefore desirable to provide an efficient scheme for allocating ASV frames in an ASV memory in a DVD audio/video system.

SUMMARY OF THE INVENTION

The present invention relates generally to a memory allocation system particularly suitable for allocating pack data of varying size to a fixed memory space. Specifically, in the field of consumer electronics related to DVD-Audio, a method, system, and apparatus is disclosed for efficiently allocating Audio Still Video (ASV) data in an ASV buffer in a DVD-A/V player. In this way, the invention provides for more efficient use of integrated circuits and on-board memory.

In one embodiment, a method of dynamically allocating available audio still video (ASV) buffer memory space in an ASV buffer for a current pack in a DVD audio bitstream is disclosed. A pack type of the current pack is determined and based upon the pack type, an ASV table is updated with a pointer corresponding to an available memory location in the ASV buffer memory space. Concurrently with the updating, a current payload associated with the current pack is stored to the available memory location.

In another embodiment, a pack type of the current pack is determined and an ASV table is updated with a pointer corresponding to an available memory location in the ASV buffer memory space based upon the pack type. Concurrently with the updating, a current payload associated with the current pack is stored to the available memory location while a pack counter is incremented. A next ASV memory write address is computed based upon the incremented pack counter and a next pack type is determined based upon the current pack type so long as the current pack is not a last pack.

In yet another embodiment, an apparatus for dynamically allocating available audio still video (ASV) buffer memory space in an ASV buffer for a current pack in a DVD audio bitstream is disclosed. The apparatus includes a means for determining a pack type of the current pack, a means for updating an ASV table with a pointer corresponding to an available memory location in the ASV buffer memory space, and a means for concurrently with the updating, storing a current payload associated with the current pack to the available memory location. The apparatus also includes a means for incrementing a pack counter, a means for computing a next ASV memory write address based upon the incremented pack counter, and a means for determining a next pack type based upon the current pack type.

In still another embodiment, a computer program product for dynamically allocating available audio still video (ASV) buffer memory space in an ASV buffer for a current pack in a DVD audio bitstream is disclosed.

Other aspects and advantages of the invention will become apparent from the following detailed description, taken in conjunction with the accompanying drawings, illustrating by way of example the principles of the invention.

BRIEF DESCRIPTION OF THE DRAWINGS

FIG. 6 illustrates a particular implementation of the ASV buffer 622 in accordance with an embodiment of the invention.

DETAILED DESCRIPTION OF THE INVENTION

In the following description, numerous specific details are set forth in order to provide a thorough understanding of the present invention. It will be apparent, however, to one skilled in the art that the present invention may be practiced without some or all of these specific details. In other instances, well known structures or operations have not been described in detail in order to not unnecessarily obscure the invention.

The present invention relates to a method, system, and apparatus for efficiently allocating memory in hardware used to perform both DVD-V and DVD-A applications. The invention provides for more efficient use of integrated circuits, such as SDRAM, and for improving allocation of memory resources without adversely affecting system performance.

In the described embodiment of the invention, a dynamic allocation of available ASV buffer memory space is performed on each pack in a DVD-A bitstream one pack at a time. Concurrently, an ASV buffer table is updated for each type of data pack currently being processed. The ASV buffer table includes pointers corresponding to the various fields that form a particular ASV frame. In this way, only that memory that is required to store a particular ASV frame is used thereby allowing the ASV buffer memory to be configured on the fly in such a manner as to efficiently store the required ASV frame data. When a particular ASV frame is to be displayed, or otherwise processed, the ASV buffer table is accessed, and the particular pointers for a specific ASV frame are looked up and used to access the desired ASV frame data stored in memory.

The invention will now be described in terms of a universal DVD-A/V player capable of playing conventional DVD-V discs, DVD-A disks, as well and DVD-A/V disks as well as any other format deemed appropriate by the manufacturer. Although described in terms of a DVD player, it should be noted that the invention can be used in any situation where dynamic allocation of memory resources is desirable where only a limited amount of memory space is available. In this way, the following description is intended to be illustrative only and should not be construed to limit neither the scope nor the intent of the invention.

Figure 1:
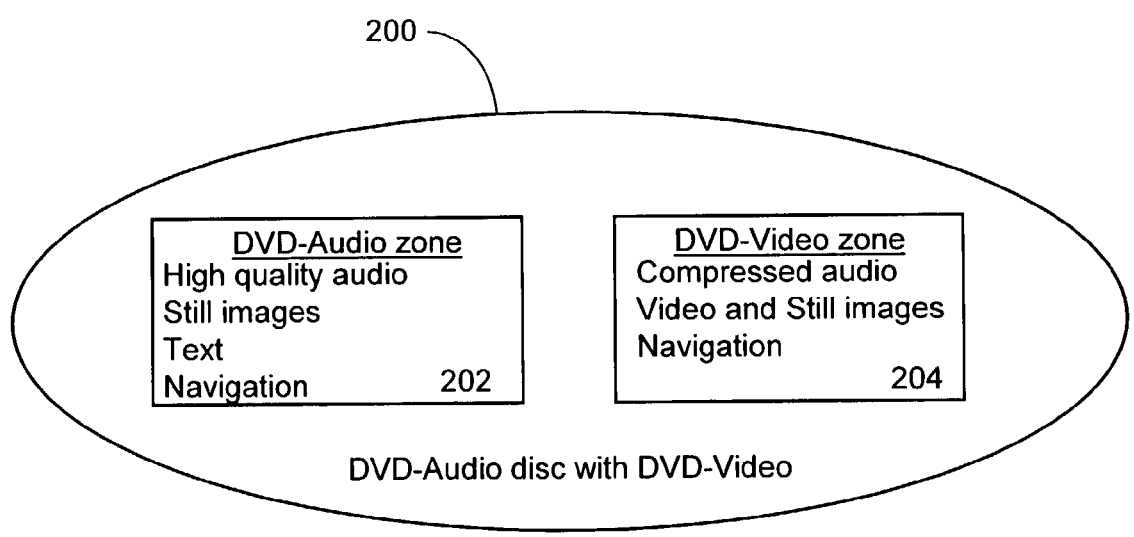
FIG. 1 shows an exemplary DVD-Audio/Video disc in accordance with an embodiment of the invention.

FIG. 1 shows an exemplary DVD-Audio disc 200 in accordance with an embodiment of the invention. In the described embodiment, the disc 200 contains audio, still video and other information on the disc as files that include audio objects and management information contained in a DVD-Audio directory 202. However, due to bandwidth limitations, it is not possible to store high quality audio and video as part of the same AV sequence on a DVD disc. Additional content can include still pictures, text information, menus & navigation and (optionally) video sequences. Still images, described as Audio Still Video (ASV), are recorded on disc 200 in a separate file. Each still image is typically an MPEG-2 intra-frame and can, optionally, be accompanied by a subpicture that can be used for information display, such as a menu. As currently configured, still images are pre-loaded into the player's memory before the audio is played or between audio tracks where a mute is acceptable. This allows the images to be presented either as a slide show or browsable by the user. Transitions for still images include effects such as cut, fade, dissolve and wipe. Subpictures allow still images to be used as menus or for the display of lyrics etc. Any additional video data on the DVD-Audio disc 200 is formed of video objects contained in a DVD-Video directory 204.

Figure 2:
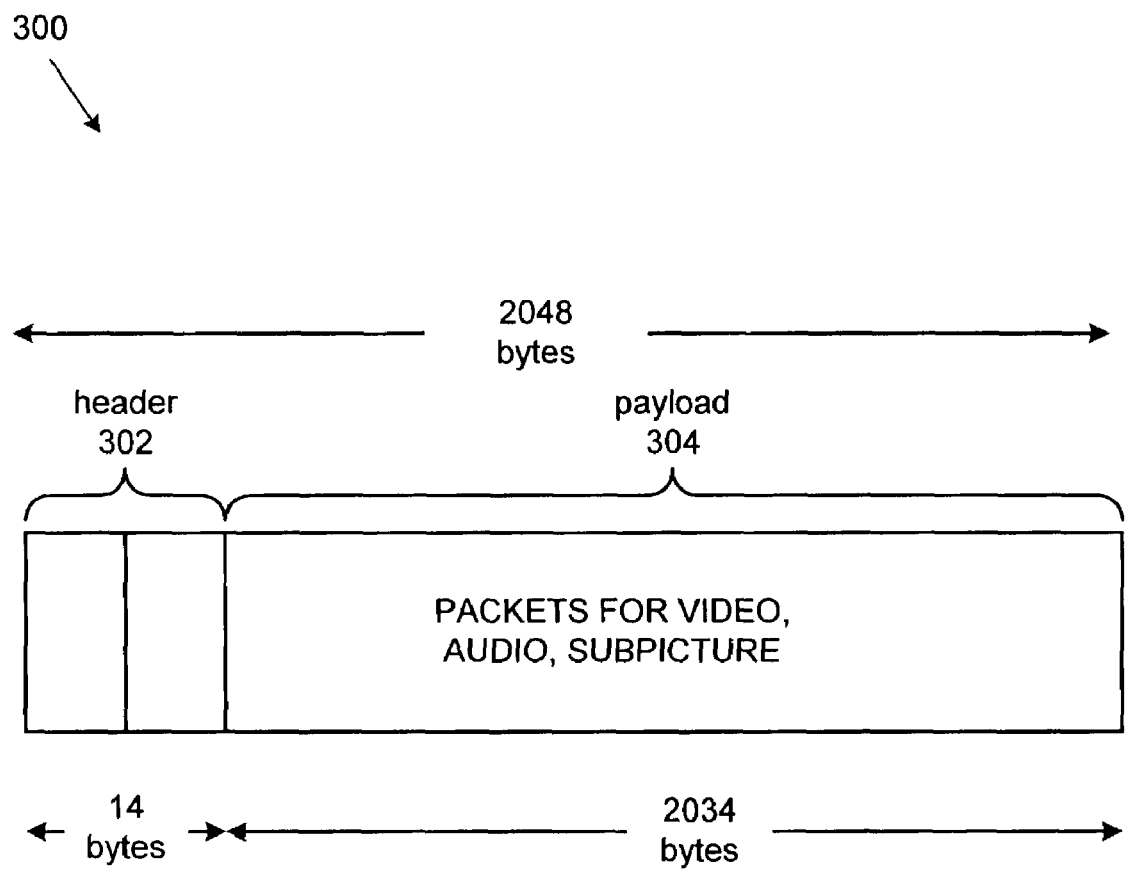
FIG. 2 shows an exemplary pack 300 in accordance with an embodiment of the invention.

In the described embodiment, the audio data and video data written on the DVD A/V disc 200 are made in units of packs. Accordingly, FIG. 2 shows an exemplary pack 300 in accordance with an embodiment of the invention. It should be noted that the pack 300 is but one particular example of such packs used for the transmission of both audio and video data and as such should not be construed to limit or otherwise restrict the scope or intent of the invention. In the described embodiment, the pack 300 has a size of 2048 bytes which includes 14 bytes associated with a pack header 302 and 2034 bytes of a payload 304 suitable for video, audio, sub-picture, and other data. The pack header 302 includes a pack start code, an SCR (system clock reference) code and a pack type code indicating which of a number of pack types is associated with the current pack. Such pack types include a highlight pack type for providing highlight information (titles, text, etc.), a subpicture pack type for providing subpicture data, a video pack type for providing video data, as well as a pgm_end pack type that delineates the end of a particular group of associated packs that form a particular audio-still video (ASV) frame. In those situations where the pack 300 is an audio pack, then the associated payload 304 can include audio data in any number of formats such as linear PCM audio data and PPCU audio data. Whereas, in those cases where the pack 300 is a video type pack, the associated payload 304 can include video data in any number of formats such as, for example, MPEG-2 or MPEG-1.

Figure 3:
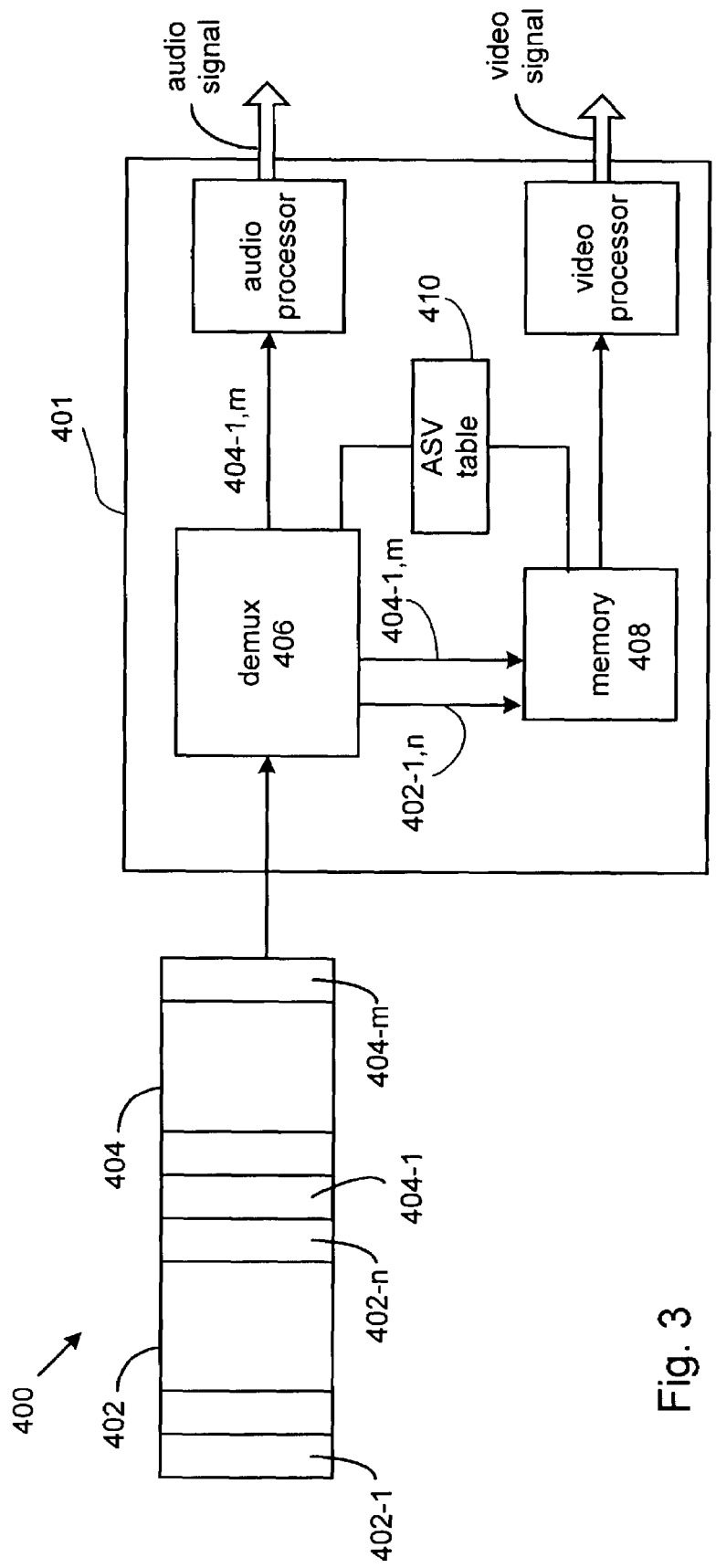
FIG. 3 illustrates an examplary primary bitstream in accordance with an embodiment of the invention.

When read from the disk 200, the audio data from a DVD-Audio disc forms a single bitstream. Therefore it is not possible to interleave audio with other data such as still video or images. For example, referring to FIG. 3, a primary bitstream 400 as read from the disc 200 is received by a player unit 401. The bitstream 400 includes a video portion 402 formed of a plurality of video packs 402-1 through 402-n, and an associated audio portion 404 formed of a number of associated audio packs 404-1 through 404-m. Since the video and audio portions can not be interleaved, the video packs 402-1 through 402-n, must be parsed from the bitstream 400 by a parser unit (or demux) 406 and stored in a memory 408 along with the audio portion 404. Concurrently with downloading the video data to the memory 408, an ASV table 410 is updated with pointers used to locate stored video data thereby facilitating the efficient storage of the video data. Either before, during, or after, the audio portion 404 is decoded to form an appropriate audio output signal, the video portion 402 stored in the memory 408 can be retrieved, decoded, and displayed as appropriate as a still image, a group of images, etc. in association with the audio program.

Figure 4:
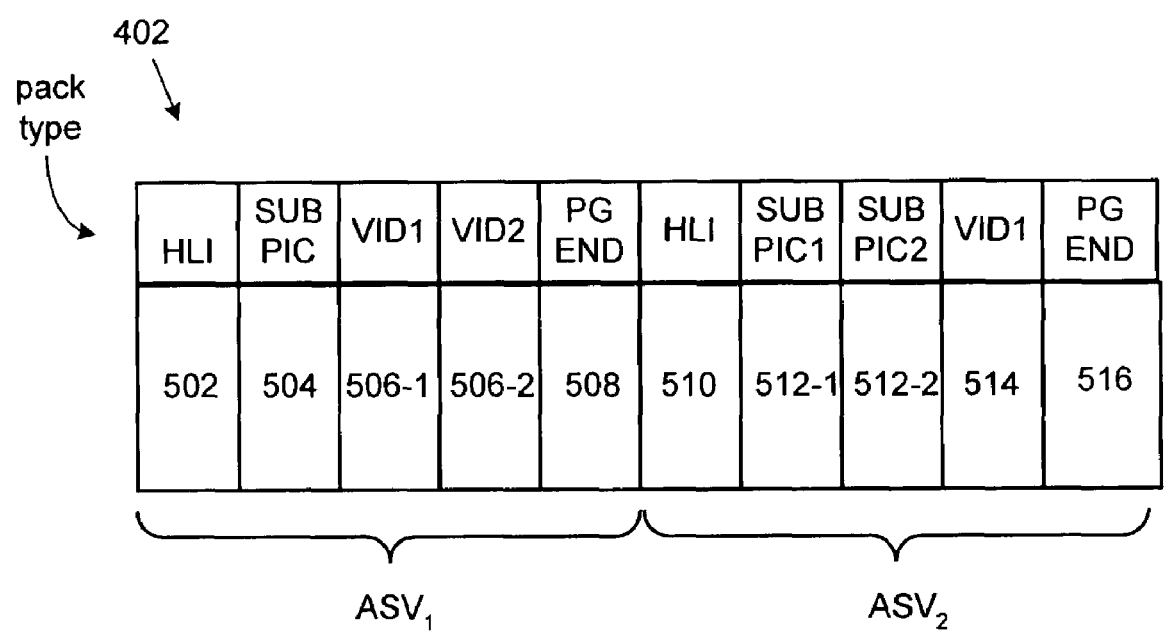
FIG. 4 shows a particular configuration of the bitstream shown in FIG. 3 having an $ASV_1$ and an $ASV_2$.

In the case where the video portion 402 of the bitstream 400 includes an ASV frame, the number of video packs that constitute a particular ASV can vary from one ASV to another. For example, FIG. 4 shows the bitstream 400 having an $ASV_1$ and an $ASV_2$ each of which are formed by a number of video packs according to the size and content of each of the respective ASVs. For example, the $ASV_1$ is formed of a highlight pack 502, a subpicture pack 504, video packs 506-1 through 506-2, and finally a pgm_end pack 508 indicating the end of that portion of the bitstream 400 corresponding to the $ASV_1$. On the other hand, the $ASV_2$ is formed of a highlight pack 510, a subpicture pack 512-1 and 512-2, a video pack 514 and a pgm_end pack 516. It is important to note, that the beginning and ending of each ASV frame is marked respectively by a highlight pack as a first one of the packs and a corresponding pgm_end pack as the last one of the packs with any number of subpicture packs and video packs between them. Accordingly, a bitstream for a particular ASV can be substantially of any length depending upon the content of the particular ASV.

It should be noted that the ordering of the various packs is set in such a way that the highlight pack always denotes a first pack of a bitstream corresponding to a particular ASV frame whereas the next most pgm_end pack is a last pack of the bitstream that marks the end of that particular ASV bitstream. Similarly, the pack type following a highlight pack can be either a subpicture pack or a video pack. Whereas, when a current pack type is a subpicture pack, the next pack can be another subpicture pack or a video pack. In a similar manner, when the current pack is a video pack, then the next pack type can be either another video pack or a pgm_end pack. It is one of the advantages of the invention, that this pack order can be used to efficiently store a number of ASV frames in a memory providing a set of pointers that indicate a start point of a group of associated packs, i.e.,. the first subpicture pack of a group of subpicture packs and so on as well as marking the beginning and ending of a particular ASV frame.

Figure 5:
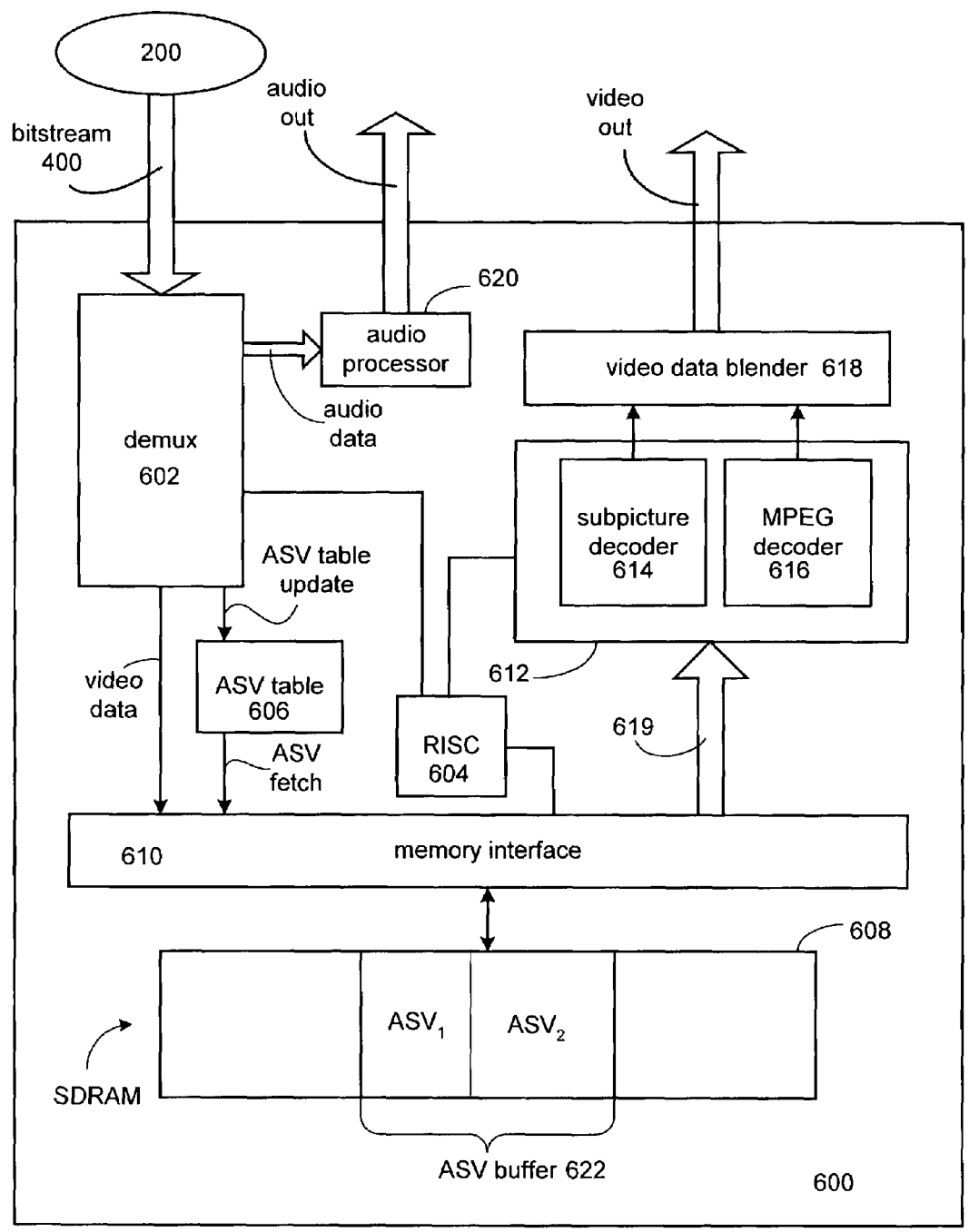
FIG. 5 is a schematic diagram of an exemplary DVD A/V player in accordance with an embodiment of the invention.

FIG. 5 is a schematic diagram of an exemplary DVD A/V player 600 in accordance with an embodiment of the invention. It should be noted that the player 600 is a particular implementation of the player unit 401 such that the demux 406 in the player 600 takes the form of a demultiplexer (or demux) 602 capable of parsing the primary bitstream 400 into its constituent audio and video portions as directed by a host controller 604. In the described embodiment, the host controller 604 is a reduced instruction set controller (RISC) unit 604. The player 600 also includes an ASV table 606 arranged to store ASV pointers used to locate particular ASV files stored in a memory 608 by way of a memory interface 610. In the described embodiment, the memory 608 is a Synchronous Dynamic Random Access Memory (SDRAM) but could, of course, be any appropriate device capable of storing appropriate ASV files. It should also be noted that even though the ASV table 606 is shown to be a discrete component for sake of clarity, it can nonetheless be incorporated in any appropriate component (such as, for example, the demux 602, the RISC unit 604, the memory 608, etc.) as deemed appropriate. The player 600 further includes a video processor unit 612 configured to process any ASV file retrieved from the SDRAM 608. In the described embodiment, the video processor 612 includes a subpicture decoder unit 614 and a video decoder unit 616 that in this example is an MPEG2 decoder unit. A video blender unit 618 combines the decoded signals from the video processor unit 612 to form an output video signal appropriate for driving a display unit, such as a television monitor, computer monitor, and the like.

In the described embodiment, the subpicture decoder unit 614 decodes data in a subpicture bitstream 619 and the decoded image is sent out to the video blender 618 to be blended with main decoded video data from the MPEG2 decoder unit 616. A display processor (not shown) controls the display of the decoded video image that typically takes the form of a still image. Audio data is extracted from the primary input bitstream 400 and passed to an audio processor 620 that typically includes a number of D/A converters for generating an appropriate analog audio output signal.

Typically, the SDRAM 608 is limited to approximately 4 MB of which 2 MB is allocated in the form of an ASV buffer 622 for specifically storing the video frame data associated with the pre-loaded ASVs. For example, data frames for $ASV_1$ through $ASV_2$ are pre-loaded into the ASV buffer 622 until such time as directed by the RISC unit 604 to be sent to the video processor 612 for processing and display, for example.

FIG. 6 illustrates a particular implementation of the ASV buffer 622 in accordance with an embodiment of the invention. The ASV buffer 622 is preloaded with the $ASV_1$ frame data and the $ASV_2$ frame data prior to a time for their processing and display. Referring back to FIG. 4 describing the specific configuration of the $ASV_1$ and $ASV_2$ frames, it should be noted that that portion of the memory space associated with the ASV buffer 622 in the memory 608 is characterized by a first pack address associated with each group of associated packs (i.e., subpicture group, video group, etc.) of a particular ASV frame. For example, the $ASV_1$ frame starts at a start address $add_0$ of the highlight pack 502, whereas the beginning of a subpicture portion of the $ASV_1$ is denoted by a start address $add_1$ of the subpicture pack 504 and so on until the end of the $ASV_1$ frame is denoted by the start address $add_3$ of the pgm-end pack 508. That portion of the ASV buffer 622 associated with the $ASV_2$ frame is similarly configured. For example, the start address $add_4$ of the highlight pack 510 denotes the start of the $ASV_2$ frame, the start address $add_5$ of the subpicture pack 512-1 denotes a start of the subpicture portion of the $ASV_2$ frame whereas the start of the video portion is denoted by the start address $add_6$ of the video pack 514, etc.

Figure 7:
FIG. 7 illustrating an exemplary ASV table in accordance with an embodiment of the invention.

In this way, when the $ASV_1$ and the $ASV_2$ frames are pre-loaded to the ASV buffer 622, the RISC unit 604 concurrently stores a series of associated pointers in the ASV table 606 that are used to located the various ASV frames and their associated pack components as they are pre-loaded, i.e., "on the fly". An example is shown in FIG. 7 illustrating a general form of an ASV table 800 in accordance with an embodiment of the invention. As noted, the ASV table 800 has stored therein a number of pointers that, in this implementation, take the form of start addresses for selected ones of the packs that taken together form a number of ASV frames, $ASV_1$ through $ASV_n$ that can be stored in the ASV buffer 622. In this way, storing ASV frame data into the ASV buffer 622 concurrently with updating the ASV table 606 avoids the problems of wasted memory resources since memory space is allocated dynamically (or on the fly) and only that memory space that is required to store a particular ASV frame is used. The pointers stored in the ASV table 606 are then used to identify the locations in memory of a start (i.e., a highlight pack) of a particular ASV frame, a first subpicture pack that indicates a beginning of a subpicture portion (if any), a first video pack that indicates a beginning of a video portion (if any) and finally, a pgm_end pack denoting the end of the ASV frame and so on.

Figure 8:
FIG. 8 shows a particular configuration of an ASV table in accordance with an embodiment of the invention.

FIG. 8 shows a particular ASV table 900 where the $ASV_1$ and $ASV_2$ (as shown in FIG. 6) frames are stored in the ASV buffer 606. As can be seen, the start addresses of those portions of the memory space defined by the ASV buffer 622 that correspond to the various components of each of the $ASV_1$ and $ASV_2$ are stored in the ASV table 606. For example, the highlight pack 502 of the $ASV_1$ has a start address $add_0$ that is stored in the ASV table 606 at a location [1,1] whereas the subpicture pack 504 of the $ASV_1$ has a start address add, stored in a location [1,2] of the ASV table 606 and so on. When a particular ASV is to be retrieved from the ASV buffer 622, the RISC unit 604 queries the ASV table 606 for the memory locations corresponding to a particular ASV. For example, when the RISC unit 604 sends an ASV fetch instruction to the SDRAM interface for a particular ASV stored in the ASV buffer 622, the ASV buffer table 606 is queried for the addresses corresponding to the selected ASV and a look up operation returns the appropriate addresses to the RISC unit 604. In this way, an increased number of ASVs can be stored in the ASV buffer 622 as compared to conventional ASV memory allocation schemes since only that memory space required to store a particular ASV is used.

Operation of the inventive memory allocation scheme in the context of the DVD player 600 will now be described.

It should be noted, that this description is but one possible operation for which the inventive memory allocation schema can be used. With regards to FIG. 5, a user sets the DVD A/V player 600 into a DVD audio mode in order to playback the DVD audio disc 200. A track buffer (not shown) stores accumulated pack data from the DVD audio disc 200. Once enough pack data has been accumulated, the bitstream 400 is formed and sent to the demux 602. In an initialization procedure associated with the player 600 being in the DVD audio mode, the RISC unit 604 allocates memory space in the memory 608 for the ASV buffer 622 and the a write pointer is set to the first memory address of the allocated memory space (i.e., the ASV buffer 622). In addition, the ASV table 606 is initialized such that all table values are set to null and at this point, the demux 602 is set in what is referred to packstop mode by the RISC unit 604. It should be noted that in the pack stop mode, the demux 602 is stopped when a current pack is received and is not restarted until a next pack is received.

Once the demux 602 has received a pack, a determination is made of the current pack type and whether or not the current pack type is the same as a previous pack type (if any). In those cases where the current pack type is not the same as the previous pack type or if the current pack is a first pack of an ASV, then the appropriate entries in the ASV table 606 is updated with a predetermined pointer. In the described embodiment, this predetermined pointer is a start address corresponding to a first one of an associated group of pack types (i.e., subpicture packs, video packs, etc.). Concurrently with the ASV table 606 being updated, the demux 602 puts the payload associated with the received pack in a location in the ASV buffer 622 consistent with the pointer stored in the ASV table 606. At this point, a pack count is updated, the next write address is determined and, based upon the current pack, the ASV buffer 622 is prepared to receive a next pack payload based upon the current pack type.

Once the ASV buffer 622 has been prepared, the demux 602 is restarted in pack stop mode in preparation for receiving the next pack. This procedure is followed until the RISC unit 604 has determined that either the maximum pack count has been reached or the ASV buffer 622 has been filled at which point, the downloading of data into the ASV buffer 622 is complete and the DVD player 600 is ready to process and ultimately display any ASVs stored in the ASV buffer 622.

Figure 9:
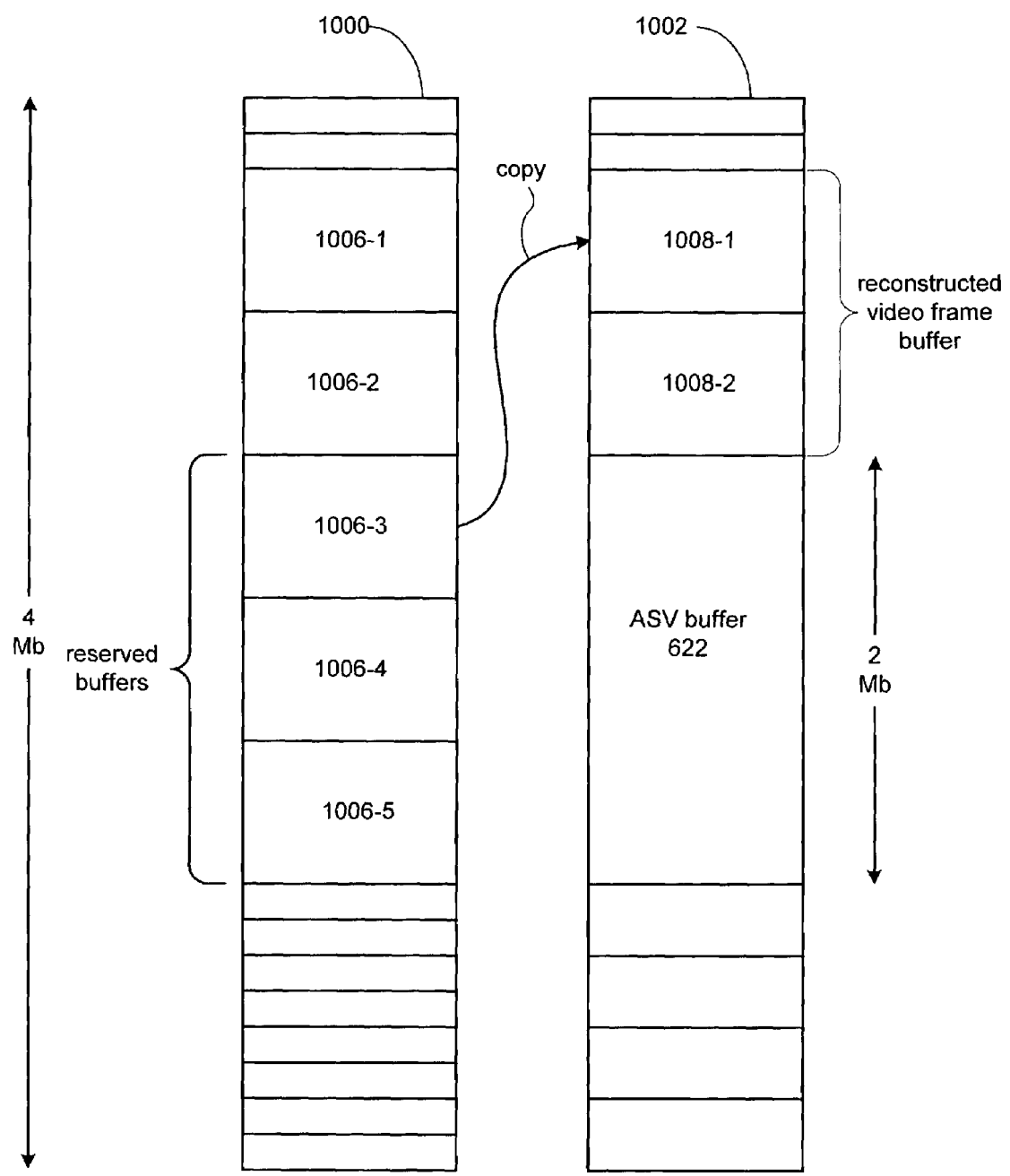
FIG. 9 illustrates a DVD-Video SDRAM memory space map for an SDRAM in the video mode and a corresponding DVD-Audio (with ASV) SDRAM memory space map for the SDRAM in the audio mode.

When the player is a DVD audio/video player, the player must be able to accommodate both DVD-Video (DVD-V) and DVD-Audio (DVD-A) disks as well as be able to switch back and forth between formats. Since the SDRAM 608 is limited to 4 MB and must be available for both formats, the allocation of memory space in the SDRAM 608 for both formats must be compatible. FIG. 9 illustrates a DVD-Video SDRAM memory space map 1000 for the SDRAM 608 in the video mode and a corresponding DVD-Audio (with ASV) SDRAM memory space map 1002 for the SDRAM 608 in the audio mode. In this implementation, there is approximately 4 MB of overlapping volatile memory (i.e., SDRAM) allocated for both DVD-V and DVD-A formats. As seen in FIG. 9, when in the video mode, the DVD-V memory space map 1000 includes various memory fields specifically allocated for various DVD-V functions. Of prime importance are the video buffers 1006-1 through 1006-5 (totaling approximately 3 MBit of the 4 MBit SDRAM memory) into which corresponding video frame data is stored. When a user converts the player 600 from the video mode to the audio mode, then the RISC unit 604 must convert the SDRAM 608 configuration from that represented by map 1000 to that represented by the map 1002. In so doing, the RISC unit 604 determines a position of the current display buffer (i.e., the video buffer whose contents is currently displayed). If the current display buffer in the map 1000 is one of a number of video buffers referred to as a reserved buffer, then the contents of the current display buffer is copied to one of what is referred to as a reconstructed video frame buffer 1008-1 in the map 1002. In this way, the video content that is currently displayed remains displayed while the ASV buffer 622 is updated with ASV frame data consistent with the DVD audio mode thereby providing a smooth transition in the switch from the DVD video mode to the DVD audio mode.

For example, in FIG. 9, the video buffers 1006-1 through 1006-5 store the video data during the video mode. When a user desires to switch to the audio mode, the RISC unit 604 reconfigures the SDRAM 608 from a configuration represented by the map 1000 to the map 1002 that includes memory space allocated for the ASV buffer 622. It should be noted, that the memory space used to form the ASV buffer 622 overlaps that memory space used for the video frame buffers 1006-3 through 1006-5 (i.e., the reserved buffers). Therefore, if the current display buffer is any of the buffers 1006-3 through 1006-5, then that video data must be copied (in what is referred to as a self copy operation) to one of the reconstructed video frame buffers 1008-1 through 1008-2. It should be noted that if in fact the current display buffer is 1006-1 or 1006-2, then a copy operation does not have to occur since the buffers 1006-1 through 1006-2 are consistent with the reconstructed video frame buffers 1008-1 through 1008-2. Once the self copy operation is complete, the RISC unit 604 then notifies the video frame buffer manager that only two video frame buffers are now being used to store video data (i.e., 1008-1 and 1008-2) so as not to overwrite the ASV buffer 622.

Figure 10:
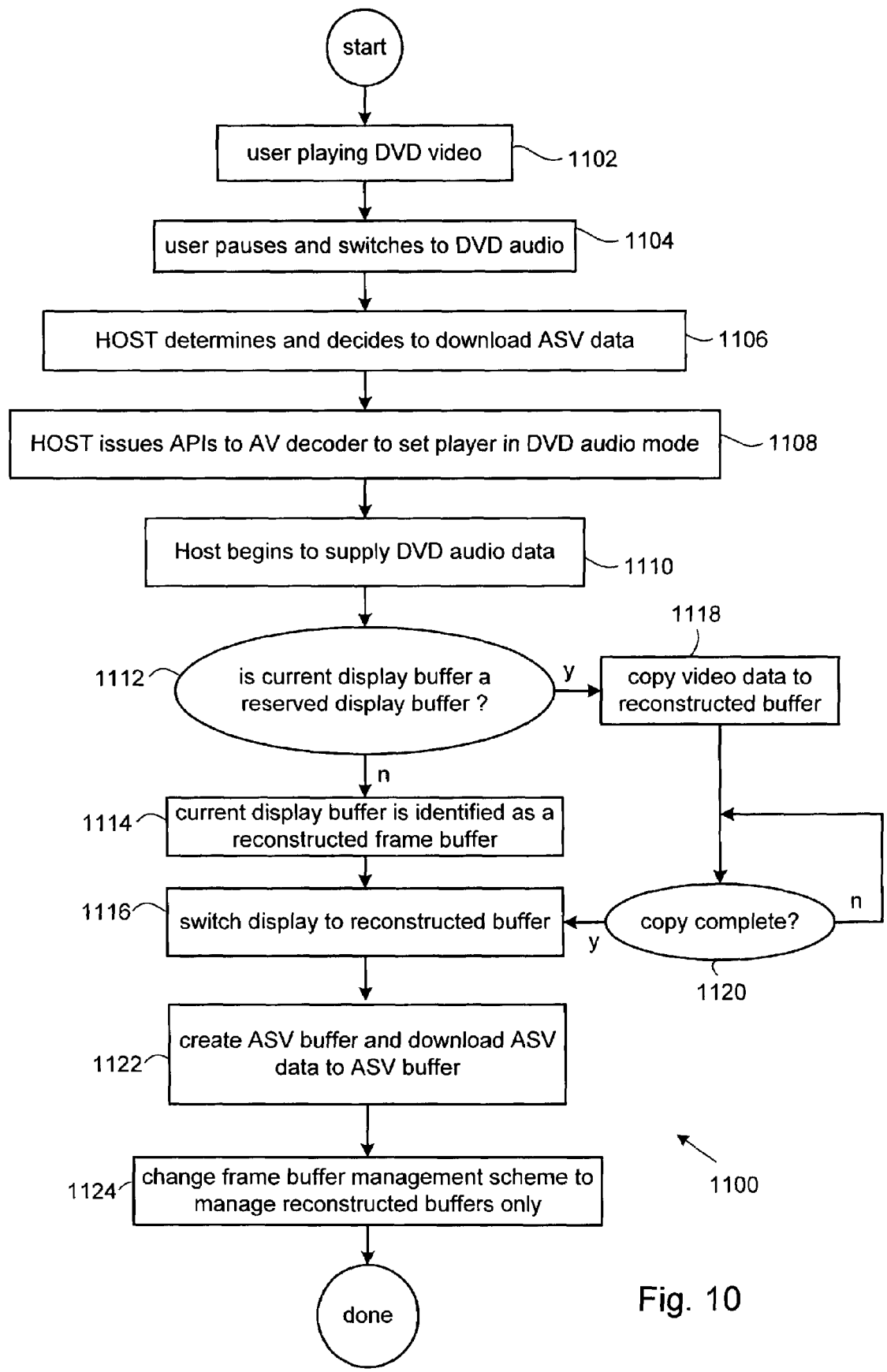
FIG. 10 illustrates a flow diagram that details a process for general operation of a universal DVD A/V player in accordance with an embodiment of the invention.

It should be noted that with regards to all hereindescribed flow diagrams, the particular order of any process operations is exemplary and should not be construed as limiting either the scope or intent of the invention. Accordingly, FIG. 10 illustrates a flow diagram that details a process 1100 for general operation of a universal DVD A/V player in accordance with an embodiment of the invention. The process 1100 can be understood in context of the FIGS. 2–10 and as such all references are directed at those figures. Accordingly, the process 1100 begins at 1102 by a user playing a DVD video disc in the universal DVD A/V player while at 1104, the user pauses the player and switches the player to a DVD audio mode. At 1106, the RISC unit (604) determines that there is ASV data to download to memory. At 1108, the RISC unit (604) directs the AV decoder to set the player to DVD audio mode and begins to supply DVD audio data at 1110. At 1112, a determination is made if the current display buffer is a reserved display buffer. If it is determined that the current display buffer is not a reserved buffer, then the current display buffer is identified as a reconstructed video buffer at 1114 and a current display pointer set at its current location at 1116. If, however, it is determined at 1112 that the current display buffer is a reserved display buffer, then the RISC unit (604) initiates a copy operation whereby the video data in the current display buffer is copied to the reconstructed video buffer at 1118. In the described embodiment, the copy operation is a self copy operation. When the copy operation is completed at 1120, the RISC unit switches the current display pointer to the reconstructed video buffer at 1116. At 1122, the RISC unit (604) creates an ASV buffer (622) that is a different memory space than the reconstructed video buffer and downloads data to the ASV buffer (622). At 1124, the RISC unit (622) directs the frame buffer manager scheme to manage the reconstructed video buffer only thereby preserving that data written to the ASV buffer (622).

Figure 11:
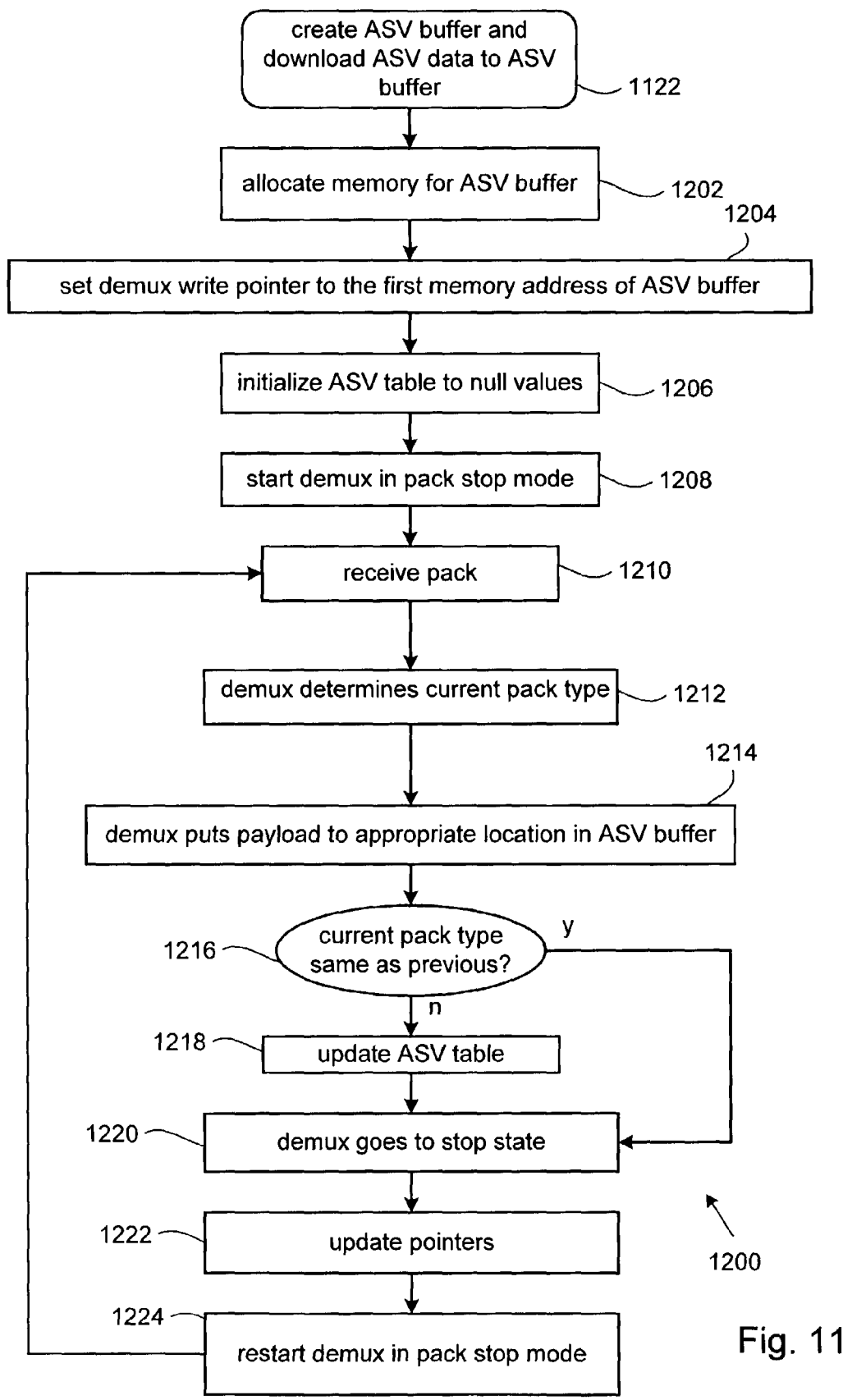
FIG. 11 illustrates a flow diagram detailing a process describing a specific implementation of the operation for creating an ASV buffer.

FIG. 11 illustrates a flow diagram detailing a process 1200 describing a specific implementation of the operation 1122 for creating an ASV buffer included in the process 1100. It should be noted that the process 1200 described herein is but one possible implementation and should not be construed as limiting either the scope or intent of the invention. Therefore, the process 1200 begins at 1202 by the RISC unit (604) allocating memory for the ASV buffer. Next, at 1204, the RISC unit (604) sets a demux write pointer to a first memory address location in the ASV buffer (622). At 1206, an ASV table (606) is initialized. In the described embodiment, the ASV table (606) is initialized by setting all entries in the ASV table (604) to null values. The RISC unit (604) then starts the demux unit (602) in pack stop mode at 1208 whereby a first pack is received at 1210. The demux unit (602) then determines a pack type of the current pack at 1212 and the demux unit (602) downloads the payload associated with the current pack to the appropriate location in the ASV buffer (622) at 1214. At 1216 a determination is made if the current pack type is the same as a previous pack type. If the current pack type is not the same as the previous pack type (or if it is the first pack), then the ASV table (606) is updated at 1218 with a pointer associated with the downloaded data and the RISC unit (604) then puts the demux unit (602) in a stop state at 1220. If, however, the current pack type is the same as the previous pack type, then control is passed directly to 1220 without updating the ASV table (606). At 1222, the pointers are updated and at 1224, the RISC unit (604) restarts the demux unit (602) in pack stop mode in preparation for receiving a next pack.

Figure 12:
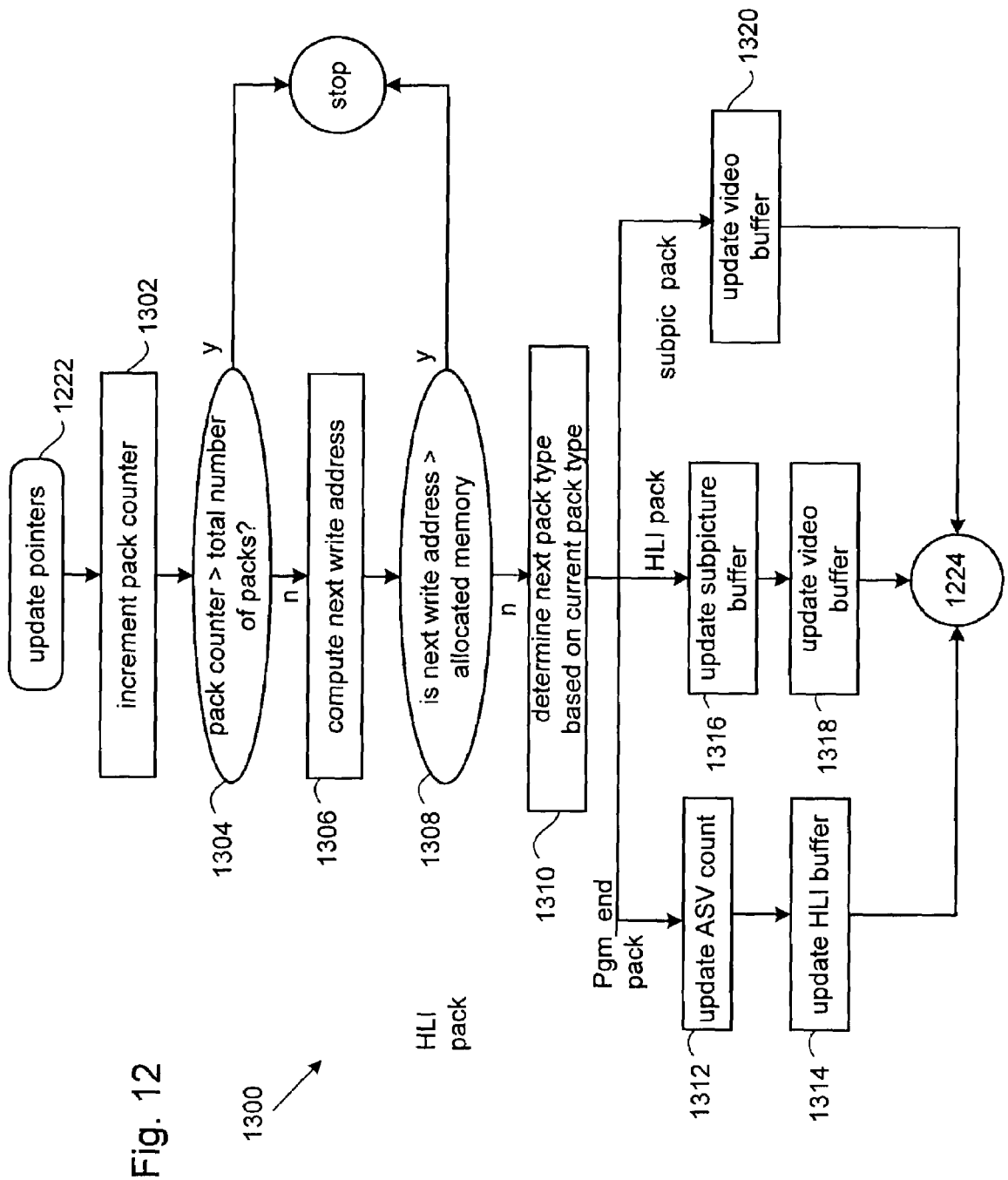
FIG. 12 illustrates a flow diagram detailing a process describing a specific implementation of the operation for updating pointers.

FIG. 12 illustrates a flow diagram detailing a process 1300 describing a specific implementation of the operation 1222 for updating pointers included in the process 1200. It should be noted that the process 1300 described herein is but one possible implementation and should not be construed as limiting either the scope or intent of the invention. Therefore, the process 1300 begins at 1302 by the RISC unit (602) incrementing a current pack count whereby at 1304, a determination is made whether or not the current pack count is greater than a total number of packs. If it is determined that the current pack count is greater than the total number of packs, then the process is stopped, otherwise, the next write address is computed at 1306. In the described embodiment, the next write address is a fixed difference from the current write address, such as 2K bytes. For example, if a first write address is address1 then the next write address is address1+2K bytes. At 1308, a determination is made if the next write address is greater than that memory allocated for the ASV buffer (622). If it is determined that the next write address is greater than that allocated for the ASV buffer (622), then the process stops, otherwise a determination is made at 1310 of a possible next pack type based upon the current pack type.

If should be noted that in the described embodiment, the possible next pack type can be determined by the current pack type since the order of packs in a particular ASV bitstream is set to that described above. Therefore, if the current pack type is a pgm_end pack type, then at 1312, an ASV counter is updated and at 1314 and an HLI buffer pointer is updated at 1314 since the pgm_end pack type indicates the end of the current ASV bitstream and the next pack type (if there is one) will have to be an HLI pack type. Similarly, if the current pack type is an HLI pack type, then at 1316 a subpicture buffer counter is updated and at 1318 a video buffer counter is updated since the next possible pack types after a HLI pack type is a subpicture pack or a video pack. If on the other hand, the current pack is a subpicture pack, then at 1320 the video buffer counter is updated. Once the next possible pack type has been determined and the corresponding buffer counters have been updated, control is passed back to 1224 transferring control to the process 1200.

Although the foregoing invention has been described in some detail for purposes of clarity of understanding, it will be apparent that certain changes and modifications may be practiced within the scope of the appended claims. It should be noted that there are alternative ways of implementing the present invention. It is therefore intended that the following appended claims be interpreted as including all such alterations, permutations, and equivalents as fall within the spirit and scope of the present invention.

What is claimed is:

1. A method of dynamically allocating available audio still video (ASV) buffer memory space in an ASV buffer for a current pack in a DVD audio bitstream, comprising:
   (a) determining a pack type of the current pack;
   (b) updating an ASV table with a pointer corresponding to an available memory location in the ASV buffer memory space, where the updating comprises:
      incrementing a current pack counter;
      computing a next ASV memory write address based upon the incremented pack counter; and
      determining a next pack type based upon the current pack type; and
   (c) concurrently with the updating, storing a current payload associated with the current pack to the available memory location.

2. The method as recited in claim 1, further comprising:
   when the current pack is not a last pack in the bitstream, then repeating (a)–(c) for a next pack in the bitstream.

3. The method as recited in claim 1, wherein the pack type is selected from a group comprising: a highlight pack, a subpicture pack, a video pack, and a pgm_end pack.

4. The method as recited in claim 1, wherein the determining a next pack type comprises:
   if the current pack type is the pgm_end pack type, then updating an ASV counter; and
   updating a highlight pack buffer counter.

5. The method as recited in claim 1, wherein the determining a next pack type comprises:
   if the current pack type is the highlight pack type, then updating a subpicture buffer; and
   updating a video buffer.

6. The method as recited in claim 1, wherein the determining a next pack type comprises:
   if the current pack type is the subpicture pack type, then updating a video buffer counter.

7. The method as recited in claim 1, where in the ASV memory buffer is a SDRAM memory.

8. The method as recited in claim 1, wherein the ASV buffer is included in a universal DVD-A/V player unit.

9. The method as recited in claim 8, further comprising:
   (v) defining an ASV frame;
   (x) retrieving the ASV frame; and
   (y) displaying the ASV frame on a display coupled to the DVD-A/V player unit.

10. A method of dynamically allocating available audio still video (ASV) buffer memory space in an ASV buffer for a current pack in a DVD audio bitstream, wherein the ASV buffer is included in a universal DVD-A/V player unit, the method comprising:
   determining a pack type of the current pack;
   updating an ASV table with a pointer corresponding to an available memory location in the ASV buffer memory space;
   concurrently with the updating, storing a current payload associated with the current pack to the available memory location;
   defining an ASV frame;
   retrieving the ASV frame; and
   displaying the ASV frame on a display coupled to the DVD-A/V player unit; wherein the defining comprises:
   locating an ASV frame highlight pack, wherein the ASV frame highlight pack corresponds to a first memory space address in the ASV buffer corresponding to the ASV frame;
   locating an ASV frame pgm_end pack, wherein the ASV frame pgm_end pack corresponds to a second memory space address in the ASV buffer corresponding to the ASV frame, wherein the first and the second memory space addresses define a portion of the ASV buffer memory space allocated to the ASV frame.

11. The method as recited in claim 10, wherein the locating an ASV frame highlight pack is based upon a first highlight pack pointer stored in the ASV table.

12. The method as recited in claim 10, wherein the locating an ASV frame pgm_end pack is based upon a first pgm_end pack pointer stored in the ASV table.

13. A method of dynamically allocating available audio still video (ASV) buffer memory space in an ASV buffer for a current pack in a DVD audio bitstream, comprising:
   (a) determining a pack type of the current pack;
   (b) updating an ASV table with a pointer corresponding to an available memory location in the ASV buffer memory space;
   (c) concurrently with the updating, storing a current payload associated with the current pack to the available memory location;
   (d) incrementing a pack counter;
   (e) computing a next ASV memory write address based upon the incremented pack counter;
   (f) determining a next pack type based upon the current pack type; and
   (g) repeating (a)–(f) for a next pack in the bitstream when the current pack is not a last pack in the bitstream.

14. The method as recited in claim 13, wherein the pack type is selected from a group comprising: a highlight pack, a subpicture pack, a video pack, and a pgm_end pack.

15. The method as recited in claim 14, wherein the determining a next pack type comprises:
   if the current pack type is the pgm-end pack type, then updating an ASV counter;
   updating a highlight pack buffer counter;
   if the current pack type is the highlight pack type, then updating a subpicture buffer;
   updating a video buffer; and
   if the current pack type is the subpicture pack type, then updating a video buffer counter.

16. The method as recited in claim 13, where in the ASV memory buffer is a SDRAM memory.

17. The method as recited in claim 13, wherein the ASV buffer is included in a universal DVD-A/V player unit.

18. The method as recited in claim 17, further comprising:
   defining an ASV frame;
   retrieving the ASV frame; and displaying the ASV frame on a display coupled to the DVD-A/V player unit.

19. The method as recited in claim 18, wherein the defining comprises:
locating an ASV frame highlight pack, wherein the ASV frame highlight pack corresponds to a first memory space address in the ASV buffer corresponding to the ASV frame;
locating an ASV frame pgm_end pack, wherein the ASV frame pgm_end pack corresponds to a second memory space address in the ASV buffer corresponding to the ASV frame, wherein the first and the second memory space addresses define a portion of the ASV buffer memory space allocated to the ASV frame.

20. The method as recited in claim 19, wherein the locating an ASV frame highlight pack is based upon a first highlight pack pointer stored in the ASV table.

21. The method as recited in claim 20, wherein the locating an ASV frame pgm_end pack is based upon a first pgm_end pack pointer stored in the ASV table.

22. An apparatus for dynamically allocating available audio still video (ASV) buffer memory space in an ASV buffer for a current pack in a DVD audio bitstream, comprising:
a means for determining a pack type of the current pack;
a means for updating an ASV table with a pointer corresponding to an available memory location in the ASV buffer memory space;
a means for concurrently with the updating, storing a current payload associated with the current pack to the available memory location;
a means for incrementing a pack counter;
a means for computing a next ASV memory write address based upon the incremented pack counter;
a means for determining a next pack type based upon the current pack type.

23. The apparatus as recited in claim 22, wherein the pack type is selected from a group comprising: a highlight pack, a subpicture pack, a video pack, and a pgm_end pack.

24. The apparatus as recited in claim 23, further comprising:
a means for updating an ASV counter;
a means for updating a highlight pack buffer counter;
a means for updating a subpicture buffer;
a means for updating a video buffer; and
a means for updating a video buffer counter.

25. The apparatus as recited in claim 22, wherein the ASV buffer is included in a universal DVD-A/V player unit.

26. The apparatus as recited in claim 25, further comprising:
a means for defining an ASV frame;
a means for retrieving the ASV frame; and
a means for displaying the ASV frame on a display coupled to the DVD-A/V player unit.

27. The apparatus as recited in claim 26, wherein the defining comprises:
a means for locating an ASV frame highlight pack, wherein the ASV frame highlight pack corresponds to a first memory space address in the ASV buffer corresponding to the ASV frame;
a means for locating an ASV frame pgm_end pack, wherein the ASV frame pgm_end pack corresponds to a second memory space address in the ASV buffer corresponding to the ASV frame, wherein the first and the second memory space addresses define a portion of the ASV buffer memory space allocated to the ASV frame.

28. A computer system for dynamically allocating available audio still video (ASV) buffer memory space in an ASV buffer for a current pack in a DVD audio bitstream, comprising:
a computer;
a computer program executing on the computer, wherein the computer program comprises computer instructions for:
determining a pack type of the current pack;
updating an ASV table with a pointer corresponding to an available memory location in the ASV buffer memory space;
concurrently with the updating, storing a current payload associated with the current pack to the available memory location;
incrementing a pack counter;
computing a next ASV memory write address based upon the incremented pack counter; and
determining a next pack type based upon the current pack type.

29. The computer system as recited in claim 28, wherein the pack type is selected from a group comprising: a highlight pack, a subpicture pack, a video pack, and a pgm_end pack.

30. The computer system as recited in claim 29, wherein the computer program further comprises computer instructions for:
updating an ASV counter;
updating a highlight pack buffer counter;
updating a subpicture buffer;
updating a video buffer; and
updating a video buffer counter.

31. The computer system as recited in claim 28, where in the ASV memory buffer is a SDRAM memory.

32. The computer system as recited in claim 28, wherein the ASV buffer is included in a universal DVD-A/V player unit.

33. The computer system as recited in claim 32, wherein the computer program further comprises computer instructions for:
defining an ASV frame;
retrieving the ASV frame; and
displaying the ASV frame on a display coupled to the DVD-A/V player unit.

34. The computer system as recited in claim 33, wherein the computer program further comprises computer instructions for:
locating an ASV frame highlight pack, wherein the ASV frame highlight pack corresponds to a first memory space address in the ASV buffer corresponding to the ASV frame; and
locating an ASV frame pgm_end pack, wherein the ASV frame pgm_end pack corresponds to a second memory space address in the ASV buffer corresponding to the ASV frame, wherein the first and the second memory space addresses define a portion of the ASV buffer memory space allocated to the ASV frame.

* * * * *

UNITED STATES PATENT AND TRADEMARK OFFICE
CERTIFICATE OF CORRECTION

PATENT NO. : 7,167,640 B2 Page 1 of 1
APPLICATION NO. : 10/074390
DATED : January 23, 2006
INVENTOR(S) : Shirish Gadre et al.

It is certified that error appears in the above-identified patent and that said Letters Patent is hereby corrected as shown below:

IN THE SPECIFICATIONS

In Table 1 at column 2, lines 1-18, please replace the DVD-Audio field "44.1, 88.2, 176.4, KHz or 48, 96 KHz" for the Sampling Rate-multichannel specification with -- 44.1, 88.2KHz or 48, 96KHz --.

Signed and Sealed this

Tenth Day of April, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,167,640 B2 | Page 1 of 1 |
| APPLICATION NO. | : 10/074390 | |
| DATED | : January 23, 2007 | |
| INVENTOR(S) | : Shirish Gadre et al. | |

It is certified that error appears in the above-identified patent and that said Letters Patent is hereby corrected as shown below:

IN THE SPECIFICATIONS

In Table 1 at column 2, lines 1-18, please replace the DVD-Audio field "44.1, 88.2, 176.4, KHz or 48, 96 KHz" for the Sampling Rate-multichannel specification with -- 44.1, 88.2KHz or 48, 96KHz --.

This certificate supersedes Certificate of Correction issued April 10, 2007.

Signed and Sealed this

Eighth Day of May, 2007

JON W. DUDAS
*Director of the United States Patent and Trademark Office*